No. 803,625. PATENTED NOV. 7, 1905.
W. F. REYNOLDS & E. J. TRAVERS.
ROLLER BEARING.
APPLICATION FILED JULY 28, 1904.
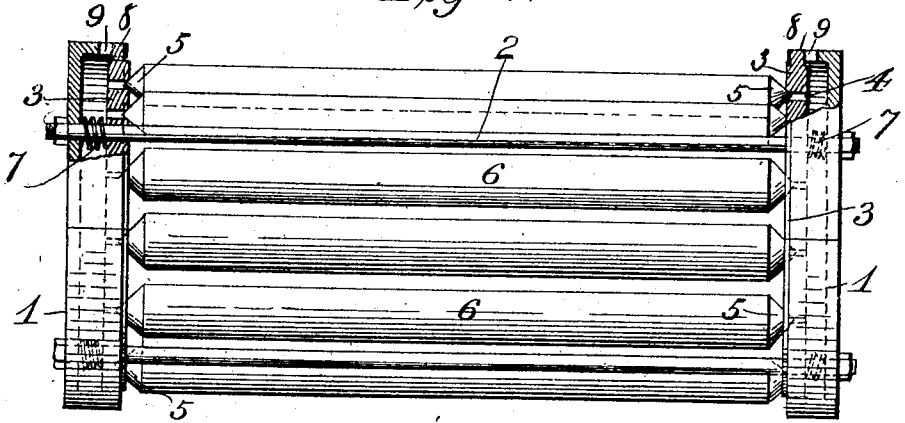
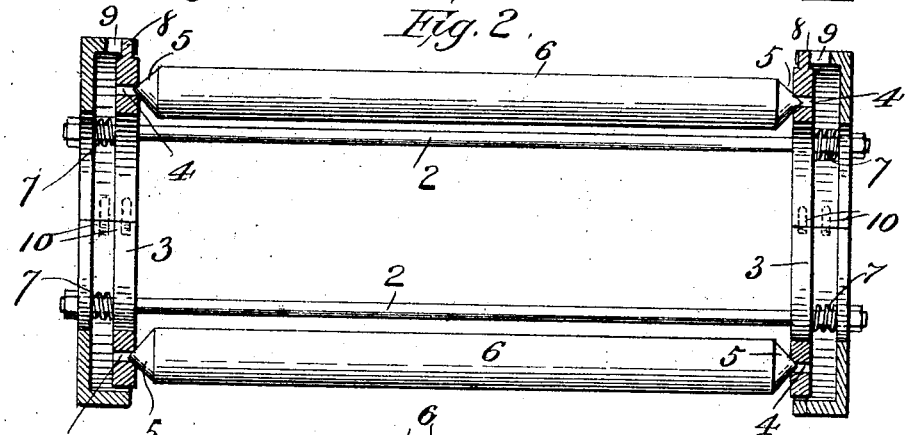
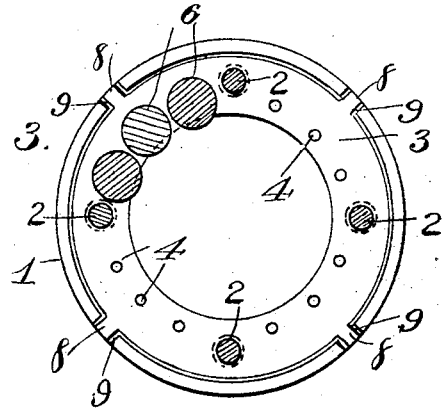
Witnesses
F. L. Ourand.
L. E. Barkley.
Inventors
W. F. Reynolds and
E. J. Travers
By Frank S. Appleman
Attorney

UNITED STATES PATENT OFFICE.

WILLIAM FLECK REYNOLDS AND ERNEST JAMES TRAVERS, OF BELFAST, IRELAND.

ROLLER-BEARING.

No. 803,625.     Specification of Letters Patent.     Patented Nov. 7, 1905.

Application filed July 28, 1904. Serial No. 218,540.

*To all whom it may concern:*

Be it known that we, WILLIAM FLECK REYNOLDS, a resident of Olney Terrace, Ballygomartin Road, and ERNEST JAMES TRAVERS, a resident of Greenview, Dunmurry, Belfast, county Antrim, Ireland, subjects of the King of Great Britain and Ireland, have invented certain new and useful Improvements in Roller-Bearings, of which the following is a specification.

This invention relates to roller-bearings; and it has for an object the novel arrangement of parts whereby a sidewise movement is permitted the rolls.

Furthermore, an object of this invention is to provide a device of this character that will be simple in construction, efficient in practice, and comparatively inexpensive to produce and maintain.

With the foregoing and other objects in view the invention consists in the details of construction and in the arrangement and combination of parts to be hereinafter more fully set forth and claimed.

In describing the invention in detail reference will be had to the accompanying drawings, forming part of this specification, wherein like characters denote corresponding parts in the several views, in which—

Figure 1 is a view in elevation, partly in section, of the bearing. Fig. 2 is a longitudinal sectional view of the bearing, some of the rollers being omitted. Fig. 3 is a transverse section of the bearing, some of the rollers being omitted.

In the drawings, 1 indicates end casings suitably separated and connected by rods 2. The casings are cup-like and have their hollow portions opposed.

Mounted loosely on the rods 2 are plates 3, provided with holes or passages 4, in which are mounted the conical ends 5 of the roller-bearings 6. To keep the plates 3 in engagement with the ends 5 of the rollers 6, springs 7 are interposed between the casing 1 and the plates 3, said springs being preferably spiral and embracing the rods 2. To hold the plates 3 against rotation within the casing, pins or lugs 8 are formed on the peripheries of the plates and are adapted to engage the slots 9 of the casings 1.

The plates and casings may be made in one piece, but preferably in sections, held one to the other by the dowel-pins 10.

Having now described our invention, what we claim as new, and desire to secure by Letters Patent, is—

1. In a roller-bearing, cup-like casings, rods securing the casings in position, said casings having apertures, plates within the casings, and movable on the rods, said plates having a plurality of apertures, pins on the plates engaging the apertures of the casings, springs interposed between the casings and the plates and rollers having their ends mounted in the apertures of the plates.

2. In a roller-bearing, casings, rods securing the casings in position, plates within the casings and movable longitudinal of the rods independent of the casings, means for preventing rotary movement of the plates independent of the casings, and rollers mounted on the plates.

3. In a roller-bearing, casings, rods securing the casings in position, plates within the casings and movable longitudinal of the rods independent of the casings, means for preventing rotary movement of the plates independently of the casings, rollers mounted on the plates and means for preventing uneven rotation between the ends of the rollers.

4. In a roller-bearing, casings suitably secured and positioned plates movably held within the casings, said plates having a plurality of apertures and rollers having their ends mounted in the apertures of the plates.

5. In a roller-bearing, casings, stay-rods securing said casings in position, plates within the casings, and mounted on the rods, said plates having a plurality of apertures, springs interposed between the casings and the plates and rollers having their ends mounted in the apertures of the plates.

6. In a roller-bearing, cup-like casings, stay-rods securing the casings in position, plates within the casings and movable on the rods, said plates having a plurality of apertures, springs embracing the rods and interposed between the plates and the base of the casings and rollers having their ends mounted in the apertures of the washers.

In testimony whereof we have affixed our signatures in presence of two witnesses.

WILLIAM FLECK REYNOLDS.
    ERNEST JAMES TRAVERS.

Witnesses:
    GEORGE MONTGOMERY ATKINSON,
    CHARLES C. GREENFIELD.